Figure 1:
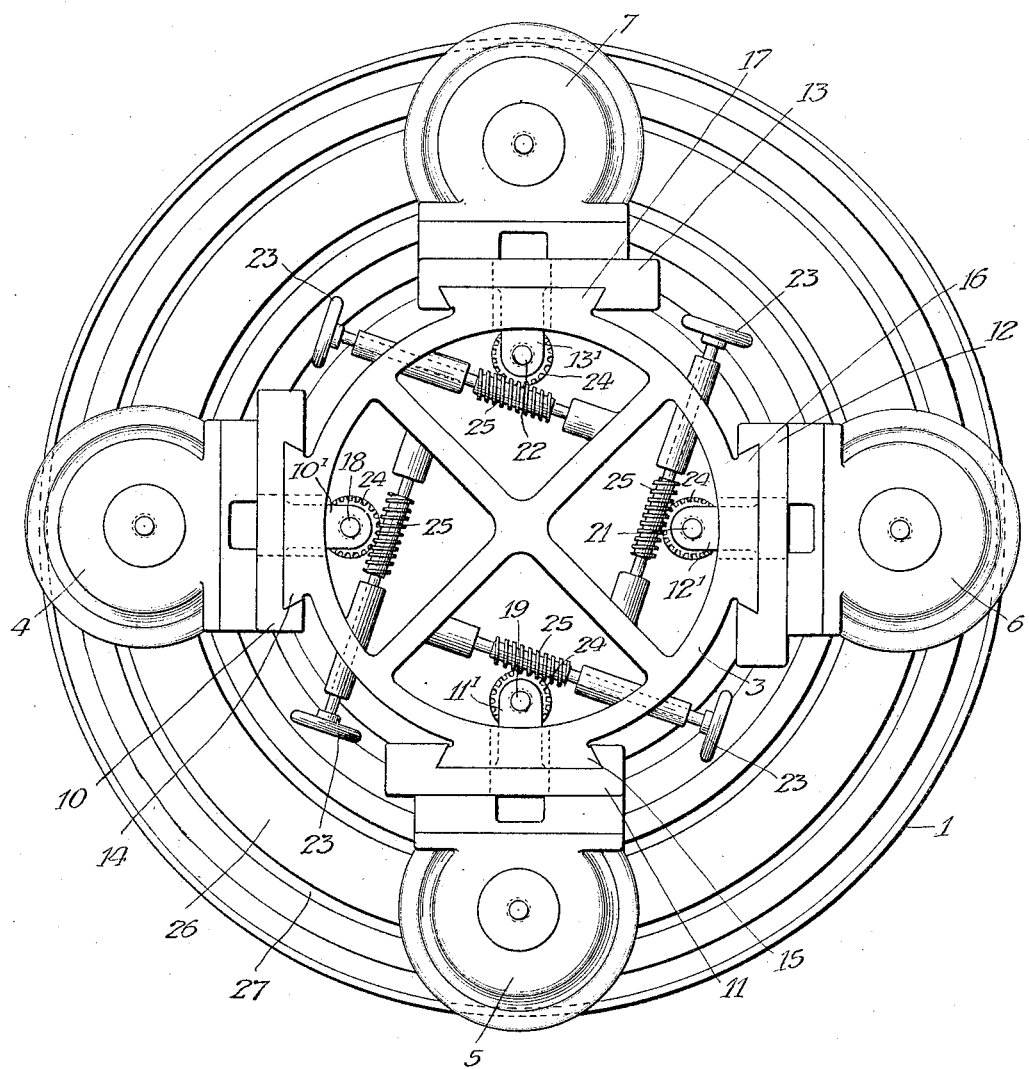

Patented May 16, 1933

1,909,614

UNITED STATES PATENT OFFICE

EDWARD B. GARDNER, OF BIG RAPIDS, MICHIGAN, ASSIGNOR TO HANCHETT MANUFACTURING CO., OF BIG RAPIDS, MICHIGAN, A CORPORATION OF MICHIGAN

ROTARY GRINDING MACHINE

Application filed July 25, 1929. Serial No. 380,961.

This invention relates to grinding machines and more particularly to a machine which has a mechanism for feeding the work to the grinding wheels.

This invention has especial utility wherever it is desired to perform several successive grinding operations on one surface of an article, as it enables the operator to fix the article on the chuck and then let the annular chuck carry the work from wheel to wheel and feed it against each wheel without further attention from the operator. Yet the operator may follow any article around the machine and readjust it on the chuck or remove it if desirable without being hindered by obstructions forming part of the machine extending outside the path of movement of the article. Long pieces which need to be ground at one end can be handled on this machine exceptionally easily because of the freedom from obstructions outside the path of travel of the chuck.

This invention provides means and methods for performing successive grinding operations on a single article which is initially fixed upon the chuck and not removed until the last grinding operation is performed, the chuck being adapted to move the article successively from the first to the succeeding grinding wheels and also to feed it against and past each wheel.

Not only does this invention possess the characteristic just above described but it also provides apparatus for carrying all of the grinding wheels inside of the path of movement of each piece of "work" and leaving the work and the chuck on which it is mounted easily accessible from any position outside of the path of its movement.

One of the objects of this invention, therefore, is to provide a grinding machine having a plurality of grinding wheels mounted thereon and having a movable chuck for feeding the work to each wheel and likewise for carrying the work from wheel to wheel.

Another object of this invention is to provide a grinding machine having a plurality of grinding wheels mounted thereon within the path of movement of the "work" together with mechanism for carrying the "work", or articles to be ground, in a path of movement outside of the support for the grinding wheels whereby the work and the means for securing it to the machine are easily accessible at all points in the path of movement of the work.

Another object of this invention is to provide a method of mounting work to be ground upon a support and carrying it in a circular path successively to and against a plurality of grinding wheels initiating and completing a series of grinding steps within 360° of rotation of the work through its circular path of movement.

Other objects, advantages and capabilities of this invention are inherently possessed by it and will later become apparent from a perusal of this specification and drawings.

Figure 2:
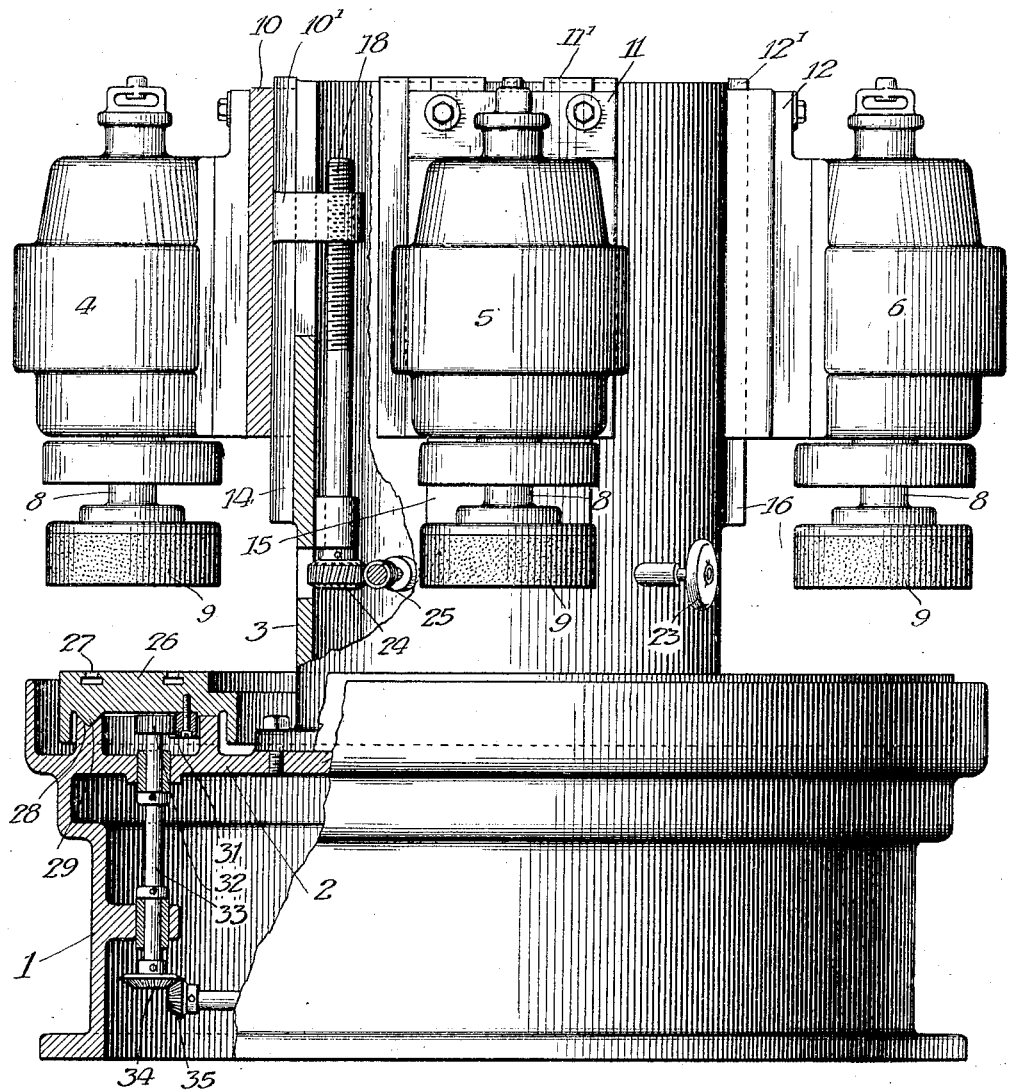

Referring now to the drawings:

Fig. 1 is a plan view of a grinding machine embodying one form of this invention, and Fig. 2 is a side elevation with parts thereof in section illustrating the same embodiment.

In the drawings, a cylindrical base 1 having integral therewith a horizontal bed 2 has mounted thereon a cylindrical support 3 having a plurality of grinding wheels.

The number of grinding wheels which may be mounted on the central cylindrical support therefore is not limited except by the relative sizes of the support and the wheels. Preferably each wheel is provided with its own driving mechanism in the form of an electric motor, there being shown four motors 4, 5, 6 and 7, each of which motors carries on the lower end of its respective shaft 8 a grinding wheel 9.

Each motor and grinding wheel is an integral unit having bases 10, 11, 12 and 13 engaged with and slidably mounted upon co-operating projections 14, 15, 16 and 17 which are provided on the central support 3. Connected to each motor base there are provided lugs 10′, 11′, 12′ and 13′, each having internally threaded holes, the threads of which are engaged with threaded spindles 18, 19, 21 and 22. These spindles may be rotated for raising and lowering the grinding wheel bases and hence the grinding wheels by means of hand wheels 23 operating through respectively associated pairs of worm gears 24 and 25.

In order to bring the work successively to the various wheels and in each case to feed it against the respective wheels and gradually under and past them an annular chuck 26 is provided with the usual slots 27 by means of which the work may be secured firmly upon the chuck face. This chuck is guided in its rotation by the cooperation of a groove 28 in the bed 2 and an annular projection 29 on the chuck. The chuck itself is rotated by means of a rack 31 which is driven by means of the pinion 32 mounted on a shaft 33, the shaft being driven through a pair of bevel gears 34 and 35, the latter of which is rotated by means of any suitable mechanism from any desired source of motive power. It is obvious that work mounted on the chuck may be carried at any desired speed from one grinding wheel to the next and fed against and under each wheel.

While a mechanical chuck is herein disclosed it should be understood that a magnetic chuck may be used in its stead.

When using this machine, if the article to be ground requires grinding on the same surface by each of the wheels mounted on the machine, the article will be mounted on the chuck and it will require no further attention or shifting on the part of the operator until the chuck has fed it successively to, under and past each of the wheels. In this case the loading and unloading of the machine can be performed from one position or two adjacent positions between the two wheels which perform the first and last grinding operations. On the other hand, whenever the article needs to be shifted to another position on the chuck during its travel or it needs to be removed before it has been fed against all of the wheels the operator or operators can conveniently have access to the chuck and the article at any position around the entire circumference of the machine. Since all of the grinding wheels are carried by a central support there are no protruding members connected with the grinding wheels which interfere with access to the work from any position around the machine. By increasing the diameter of the machine a greater number of grinding wheels may be mounted thereon and a greater number of successive steps in a continuous grinding operation may be performed or a greater number of separate and complete cycles may be performed on the one machine under the control of several operators. For example, if nine grinding wheels are carried on a single machine and only three grinding steps are required for a single surface three different complete cycles can therefore be performed on the same machine independently of each other.

It should be understood that other embodiments of the invention and modifications thereof may be devised which will yet employ the principles of this invention as defined in the claims which follow.

Having shown and described this invention, I claim:

1. A grinding machine comprising a base and an annular chuck rotatably carried thereon, a grinding wheel support centrally upstanding from said base through and rising higher than said chuck, a plurality of grinding wheels, individual driving motors therefor carried solely on said support with the grinding wheels overhanging the annular face of the chuck, means for adjusting said wheels relatively to the face of said chuck and maintaining said wheels in adjusted position during grinding operation, and means for continuously rotating said chuck for feeding articles against, under and away from said wheels.

2. A grinding machine comprising a base, an annular chuck rotatably carried thereon, a grinding wheel support extending upwardly through the center of said base to a point substantially above said chuck, a plurality of grinding wheels carried by said center support, driving means therefor carried solely by said support, said wheels and driving means lying within the confines of said chuck with the grinding wheels overhanging the annular face thereof, means for adjusting said wheels relatively to the face of said chuck and for locking the wheels in adjusted position during grinding operation, and means for continuously rotating said chuck for feeding articles thereon successively to, under, and away from said wheels.

In witness of the foregoing I affix my signature.

EDWARD B. GARDNER.